May 5, 1959 K. R. FRECHETTE 2,885,042
SPRING TYPE CLUTCH AND BRAKE DEVICES
Filed June 17, 1957 3 Sheets-Sheet 2

INVENTOR
KENNETH R. FRECHETTE
BY Thomas S. Ross
Albert W. Scribner
ATTORNEYS

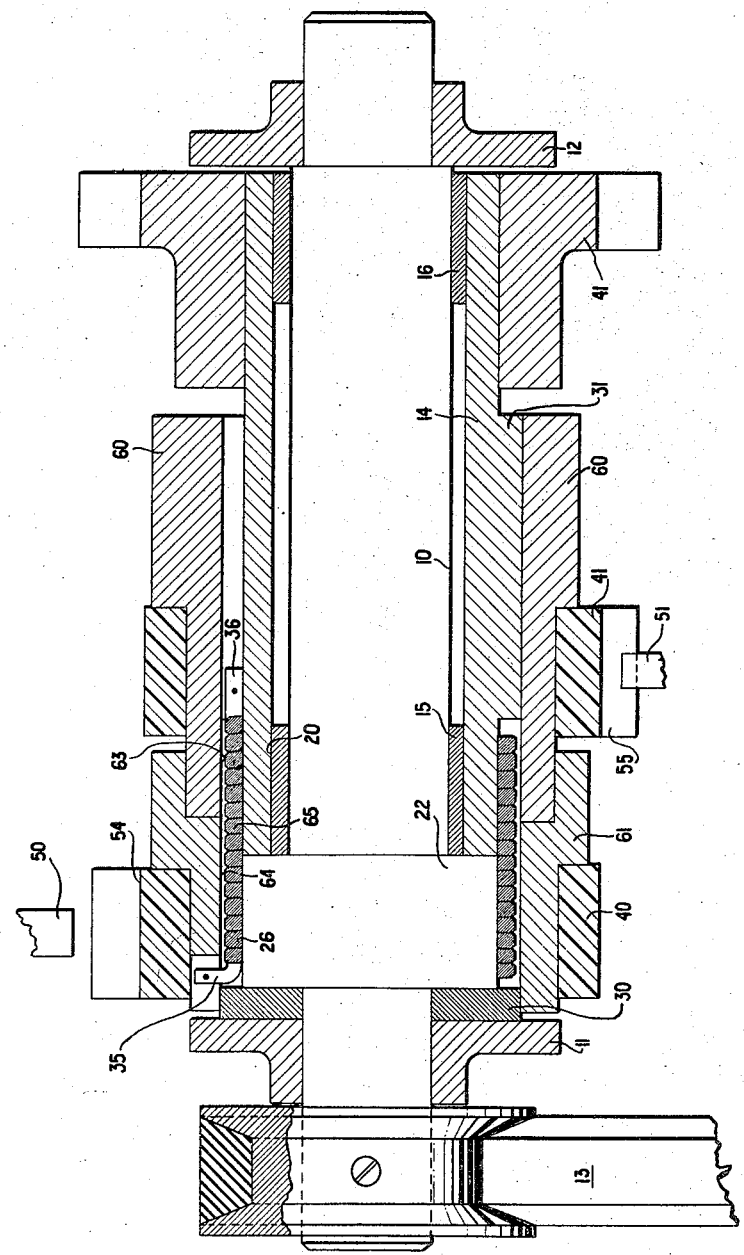

United States Patent Office 2,885,042
Patented May 5, 1959

2,885,042

SPRING TYPE CLUTCH AND BRAKE DEVICES

Kenneth R. Frechette, East Hartford, Conn., assignor to Royal McBee Corporation, Port Chester, N.Y., a corporation of New York Application June 17, 1957, Serial No. 666,034

1 Claim. (Cl. 192—12)

This invention relates to a spring type clutch and brake device and more particularly relates to a novel arrangement construction for the driving and driven elements of such a device.

In conventional arrangements of this type the coupling spring radially grips both a driving member and a coaxially disposed driven member. When this clutching action is to be terminated the coupling spring is moved in a radially outward direction to grip a stationary member thereby braking said driven member. The difficulty presented in the operation of conventional type devices is that when said braking action occurs all of the rotational inertia of the driven load is absorbed by a very small portion of the coupling spring, hence said spring will frequently break or otherwise fail under the resultant high stress conditions.

One object of the instant invention is to provide a novel construction for a spring type clutch and brake system whereby the incidence of breakage and failure of the clutch elements is substantially reduced.

Another object of the invention is to provide a novel structural inter-relationship between the coupling spring and the braking and braked member of a spring type clutch and brake system whereby the stresses imposed on said spring by the braking of the driven load will be distributed over an extended length of said spring.

Other objects of the invention will become apparent as the disclosure progresses.

In the drawings:

Fig. 4 is a partial axial sectional view showing the principal parts of a spring type clutch and brake device which is constructed in accordance with the instant invention.

Figure 1:
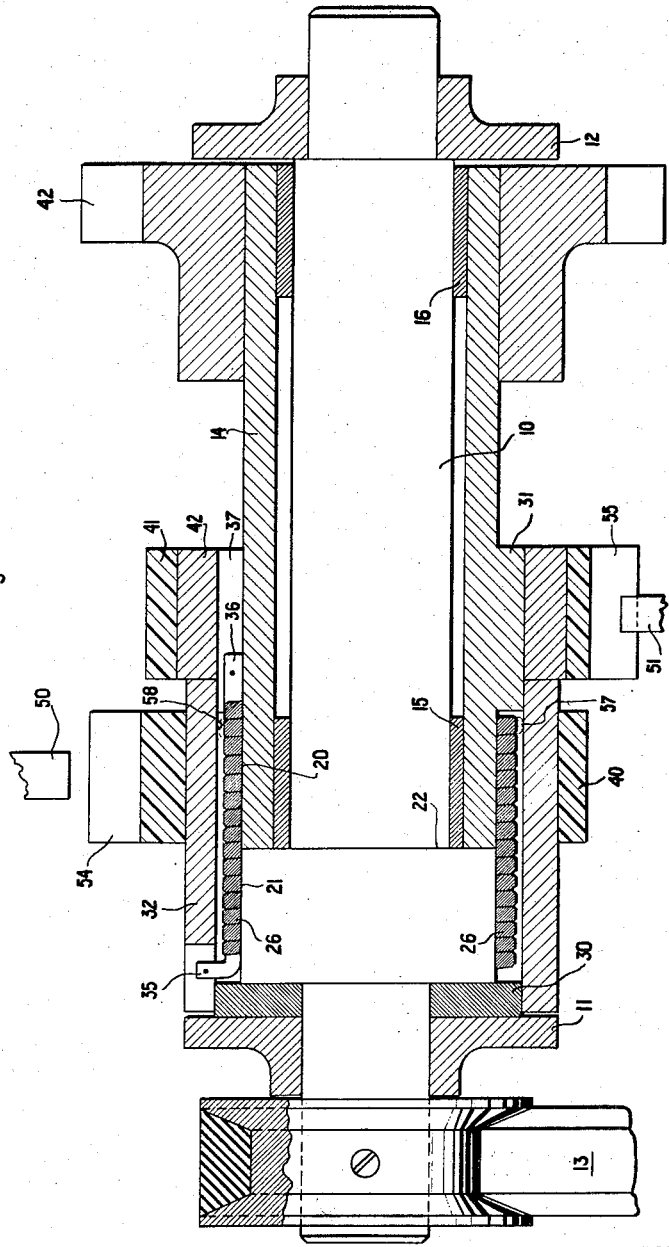
Fig. 1 is a partial axial sectional view showing the component parts of a conventional type spring clutch and brake device.

Fig. 1 shows a driving shaft 10 which is journalled in the stationary bearings 11 and 12 and which is rotatably driven by any suitable means such as the pulley and belt arrangement shown at 13. A driven member 14 is rotatably mounted on shaft 10 by means of bushings 15 and 16, so that the outer cylindrical surface 20 of said member 14 is coextensive with the outer cylindrical surface 21 of the flanged portion 22 of said shaft. Wrapped around said surfaces 20 and 21 is a helical coupling spring 26. Rotatably mounted on shaft 10 is a disk 30 which, in combination with the flange 31 on said driven member 14, rotatably supports the sleeve 32. The left hand end 35 of the coupling spring 26 is rotatably secured by any suitable means to said sleeve 32 while the right hand end 36 thereof is rotatably secured in the slot 37 formed in the flange 31 of said driven member 14. The clutch control disk 40 is rotatably secured to the sleeve 32 while the clutch control disk 41 is rotatably secured to the collar 42 which in turn is rotatably secured to the flange 31 of said driven member 14.

The spring 26 has a normal diametrical dimension such that when mounted as shown in Fig. 1 said spring will be radially expanded to a slight extent to thereby normally radially and circumferentially grip the said cylindrical surfaces 20 and 21 of the driving shaft 10 and the driven sleeve 14. In this mounted position the hand of the spring helix is opposite the direction of rotation of said shaft 10 so that the transmittal of torque loads through the device will serve to tighten the grip of said spring 26 on said cylindrical surfaces.

Figure 2:
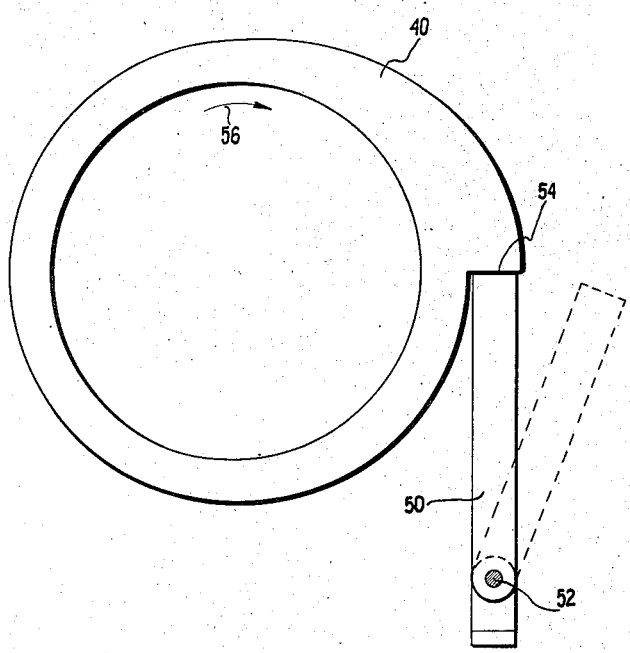
Figs. 2 and 3 are side elevational views showing the construction and mode of operation of the clutch control elements of the instant apparatus.
Figure 3:
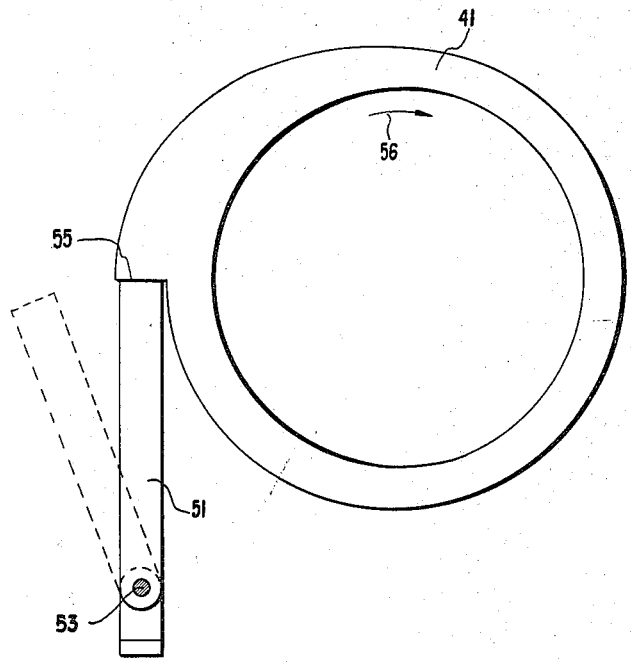

In operation the shaft 10 is constantly rotated and the spring 26 is retained in the disengaged condition by relatively rotatably displacing the clutch control disks 40 and 41 in a direction which will "unwind" the spring 26 whereby the spring is radially expanded and hence will be out of operative engagement with said surfaces 20 and 21. To hold said disks 40 and 41 in this condition two latches 50 and 51, pivotally mounted on independent stationary shafts 52 and 53, are provided which respectively cooperate with the notches 54 and 55 on the periphery of said disk members 40 and 41 respectively as shown in Figs. 2 and 3. Arrows 56 indicate the direction of rotation of the driving shaft 10. To engage the clutch the latch 50 is moved and held away from said notch 52, as shown by dotted lines in Fig. 2, thereby freeing disk member 40 for rotation in a clockwise direction, Fig. 2, under the action of the spring itself whereupon said spring 26 will grip said surfaces 20 and 21 in the manner above described. Thereafter the shaft 10, sleeve 32, spring 26, the driven member 14 and the disk members 40 and 41 will rotate as a unit thereby permitting transmittal of a torque load through the device. In this engaged condition of the clutch, the latch member 51, Fig. 3, will idly ratchet over the said peripheral notch 55 of disk 41. A gear, pulley or other suitable means, indicated at 42, Fig. 1, may be rotatably secured to sleeve 14 to facilitate a power take off from the clutch mechanism.

To disengage the clutch and to impose a braking torque on the driven member 14, latch 50 is moved back to the solid line position shown in Fig. 2, thereby rotatably arresting the control disk 40. The left end 35 of spring 26 will now be stationary while the right end 36 will continue to rotate with the driven member 14 due to the rotational inertia of said member 14 and the remaining portion of the driven load. Under these conditions the right end 36 of spring 16 will immediately commence to unwind i.e. rotate in a direction which is the same as the hand of the coils of the spring, and hence said coils will progressively expand radially outward, as shown by the dotted lines 57 of Fig 1, and the outer peripheral surfaces thereof will then frictionally engage the inner cylindrical surface 58 of the now stationary sleeve 32. Here due to the fact that the left end 35 of the spring 26 is held stationary and that only a very small amount of radial expansion of the right end 36 of the spring is required to have the latter engage said inner surface 58, the braking of the driven load will occur almost instantaneously after the latch 50 has been returned to the solid line position of Fig. 2. Under these conditions it will be apparent that substantially all of the angular momentum of the driven member 14, gear 42 and the rest of the driven load will be absorbed by the relatively small amount of spring material in the extreme right end of the spring 26, thus imposing excessive stresses and strains on said portion of the spring. These conditions have been found to cause a frequent failure or breakage of the spring which obviously necessitates the tedious and time consuming replacement of the latter.

Fig. 4 shows a novel arrangement and construction for the above described spring type clutch and brake device whereby any braking loads applied to the device will be properly distributed over an appreciable length of the spring thus preventing any misoperation and/or failure thereof.

In Figs. 1 and 4 like reference numerals denote similar structural elements. In Fig. 4, the clutch control disk 41 is rotatably secured to the elongated collar 60 which in turn is rotatably secured to the flange 31 of the driven member 14. The clutch control disk 40 is rotatably secured to the sleeve 61 which is rotatably supported at either of its ends by disk 30 and the left hand end of the said collar 60 respectively. The right end, Fig. 4, of sleeve 61 is counterbored to receive the left end of collar 60. The left hand end 35 of spring 26 is connected by any suitable means to the sleeve 61 while the right hand end 36 thereof is secured to the flange 31 of the driven member 14. It will be seen that between a third and a half of the axial length of the spring 26 is surrounded by the inner surface 63 of said collar 60 and that said surface 63 is coextensive with the inner braking surface 64 of said sleeve 61.

In operation the clutch may be engaged by rotatably releasing the control disk 40 as above described. During the subsequent operation of the clutch the shaft 10, member 14, spring 26, sleeve 61, collar 60 and control disks 40 and 41 rotate together as a unit. When the clutch is to be disengaged, and a braking torque applied to the driven load, lever 50 is rotated into engagement with the notch 54 of control disk 40 as above described whereby the rotational movement of said disk 40, sleeve 61 and the left end 35 of spring 26 is arrested. Thereafter the right hand end 36 of the spring collar 60 control disk 41 and the driven member 14 continue to rotate due to the inertia of the driven load. Under these conditions the spring 26 will commence to unwind at its right end and hence this portion of the spring will expand radially and in doing so will engage said inner surface 63 of collar 60. When this occurs, however, no braking torque will be effected in that said collar 60 is still rotating with the driven member 14 and the right end 36 of the spring. The spring coils adjacent the right end of spring 26 will progressively expand outwardly until the coil 65 near the center of the spring frictionally engages the inner walls 64 of the now stationary sleeve 61. When this occurs a braking torque will be immediately applied to the driven load. The operational distinction here, over that described in connection with the operation of the device of Fig. 1, is that the rotational inertia of the driven load will be absorbed by a much greater amount of spring material during the braking action in that here there is a considerable number of spring coils between said control coil 65 and the right hand end 36 of said spring 26. Hence the stresses and strains imposed in the spring 26 by the braking action will be more uniformly distributed throughout a relatively large amount of spring material and the incidence of breakage and failure thereof will be greatly reduced. Thus with a relatively slight change in the structure and arrangement of the component parts of the device, as shown in Fig. 4, a significant improvement in the characteristics of operation thereof may be obtained.

Apparatus constructed in accordance with Fig. 4 has been successfully operated under severe test conditions and the useful life of the spring, even under these conditions has been found to be substantially lengthened.

While there is in this application specifically described one form which the invention may assume in practice, it will be understood that this form of the same is shown for purposes of illustration only and that the invention may be modified and embodied in various other forms without departing from its spirit or the scope of the appended claim.

The invention claimed is:

A spring type clutch and brake device, a rotatably mounted driving shaft, a flange portion formed on said shaft and having a cylindrical outer surface, a driven member rotatably mounted on said shaft in coaxial relation thereto, said member having a cylindrical outer surface which is adjacent to and coextensive with the said outer surface of said flange portion, a helical wrap spring operatively disposed about said cylindrical surfaces, there being approximately the same number of turns of said spring engaging each of said cylindrical surfaces, a sleeve rotatably mounted with respect to said shaft and being connected to one end of said spring, said sleeve having a cylindrical inner braking surface which is disposed about several turns of said spring, an axially elongated collar rotatably secured to said driven member and having one end seated in the adjacent counterbored end of said sleeve, said collar being secured to the other end of said spring and having a cylindrical inner braking surface which is coextensive with the inner cylindrical surface of said sleeve and which surrounds several turns of said spring, and means for controlling the relative rotation of said sleeve and collar.

References Cited in the file of this patent

UNITED STATES PATENTS

| | | |
|---|---|---|
| Re. 22,852 | Swift | Mar. 11, 1947 |
| 1,260,650 | Cook | Mar. 26, 1918 |
| 2,052,961 | Bonham | Sept. 1, 1936 |
| 2,302,312 | Greenlee et al. | Nov. 17, 1942 |
| 2,652,134 | Montooth | Sept. 15, 1953 |
| 2,669,331 | Dudis et al. | Feb. 16, 1954 |
| 2,751,773 | Woodson | June 26, 1956 |

FOREIGN PATENTS

| | | |
|---|---|---|
| 1,067,245 | France | Nov. 28, 1952 |
| 911,564 | Germany | May 17, 1954 |